(12) United States Patent
Jain et al.

(10) Patent No.: US 11,200,319 B2
(45) Date of Patent: Dec. 14, 2021

(54) CLOUD ENABLING OF LEGACY TRUSTED NETWORKING DEVICES FOR ZERO TOUCH PROVISIONING AND ENTERPRISE AS A SERVICE

(71) Applicant: Cisco Technology, Inc., San Jose, CA (US)

(72) Inventors: Prakash C. Jain, Fremont, CA (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 314 days.

(21) Appl. No.: 16/375,574

(22) Filed: Apr. 4, 2019

(65) Prior Publication Data

US 2020/0320197 A1    Oct. 8, 2020

(51) Int. Cl.
*G06F 21/56* (2013.01)
*G06F 13/38* (2006.01)
*H04L 29/06* (2006.01)

(52) U.S. Cl.
CPC .......... *G06F 21/567* (2013.01); *G06F 13/385* (2013.01); *H04L 63/1441* (2013.01); *H04L 63/20* (2013.01); *G06F 2213/0042* (2013.01)

(58) Field of Classification Search
CPC ........... G06F 13/385; G06F 2213/0042; G06F 21/567; G06F 21/56; H04L 63/1441; H04L 67/1097; H04L 67/20; H04L 41/0846; H04L 41/0806; H04L 41/82; H04L 29/06
USPC .......................................................... 726/22
See application file for complete search history.

(56) References Cited

U.S. PATENT DOCUMENTS

| | | | |
|---|---|---|---|
| 8,869,236 B1* | 10/2014 | Tonogai | H04L 41/0843 726/1 |
| 9,465,668 B1* | 10/2016 | Roskind | H04L 67/10 |
| 9,578,140 B2 | 2/2017 | Krzyzanowski et al. | |
| 9,756,030 B2* | 9/2017 | Carrer | H04W 12/08 |
| 10,477,463 B2* | 11/2019 | Roskind | H04W 48/16 |
| 10,514,935 B2* | 12/2019 | Chen | H04L 67/1097 |
| 10,637,731 B2* | 4/2020 | McNab | G05B 19/042 |
| 10,797,988 B2* | 10/2020 | Huang | H04L 45/026 |
| 10,825,266 B2* | 11/2020 | Srinivasan | H04L 9/3226 |

(Continued)

OTHER PUBLICATIONS

International Search Report and Written Opinion from the International Searching Authority, dated Jun. 22, 2020, 11 pages, for corresponding International Patent Application No. PCT/US2020/024723.

(Continued)

*Primary Examiner* — Amare F Tabor
(74) *Attorney, Agent, or Firm* — Polsinelli PC

(57) ABSTRACT

The disclosed technology relates to a process for zero touch provisioning to provide cloud enablement of legacy computing devices. Specifically, the disclosed technology provides the ability to automate the process of connecting computing devices that may not originally have the capabilities to connect to the Internet so that the computing devices can be managed by a cloud network or be provided updates by the cloud network. The cloud enablement for computing devices is performed by modifying the computing device with hardware and software that would direct the computing device to establish secure communications with the cloud network without user involvement.

8 Claims, 4 Drawing Sheets

(56) References Cited

U.S. PATENT DOCUMENTS

| | | |
|---|---|---|
| 2013/0091502 A1 | 4/2013 | Kang et al. |
| 2014/0075431 A1 | 3/2014 | Kumar et al. |
| 2016/0191627 A1 | 6/2016 | Huang et al. |
| 2018/0191582 A1 | 7/2018 | Amendjian et al. |
| 2018/0375648 A1* | 12/2018 | Huang .................. H04L 9/0662 |
| 2019/0037030 A1* | 1/2019 | Heindl ...................... G06F 3/16 |
| 2019/0386977 A1* | 12/2019 | Shah ..................... H04W 12/30 |
| 2020/0311262 A1* | 10/2020 | Nguyen .............. H04L 63/1441 |
| 2020/0387136 A1* | 12/2020 | Poschmann .......... G05B 19/406 |

OTHER PUBLICATIONS

"Using IoT Device Gateways to Unlock Business Value from Legacy Machines," www.lantronix.com, Dec. 13, 2017, 4 pages.
"Connecting Legacy Devices to the Internet of Things (IoT)," www.intel.com, 2018, 2 pages.

* cited by examiner

CLOUD ENABLING OF LEGACY TRUSTED NETWORKING DEVICES FOR ZERO TOUCH PROVISIONING AND ENTERPRISE AS A SERVICE

TECHNICAL FIELD

The subject matter of this disclosure relates in general to the field of cloud networking, operations, management, and services. More specifically, this disclosure pertains to cloud enabling of legacy trusted networking devices for zero touch provisioning and enterprise as a service.

BACKGROUND

When it comes to computing devices (e.g. networking equipment), reliable operations of computing devices made by various companies is a characteristic that builds customer trust over time. In general, computing devices have become integrated in our everyday lives. Enterprises may have a variety of different reliable and proven computing devices (e.g. network devices). However there may be some computing devices (herein referred to as legacy devices) that are older and thus not capable of connecting to the cloud or have not been configured to implement newer features such as implementing zero-day security or allowing the legacy devices to be managed over the cloud.

Since enterprises may have any number of different computing devices that are trusted in their operation for everyday use, it is not desirable to replace all these existing computing devices for the purpose of having devices that have the newer features such as zero-day security or management over the cloud. Furthermore, with the sheer number of computing devices that enterprises can have, the resources and time needed to update (if possible) the legacy devices can also be burdensome. Thus a solution for configuring the legacy devices (for example, in order to provide zero-touch provisioning, zero-day security, and management of the existing computing devices over the cloud) is needed.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

Figure 1:
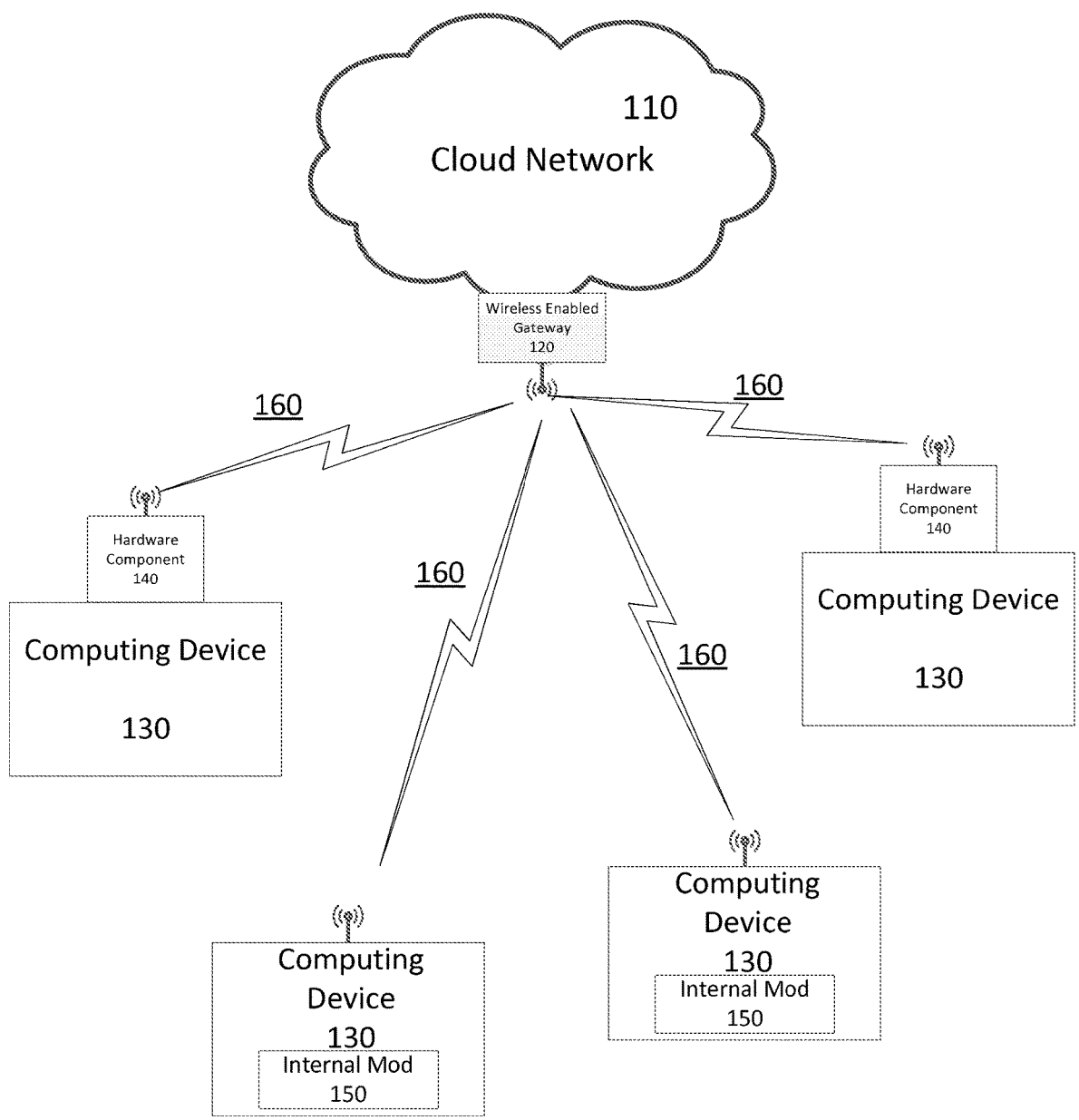
FIG. 1 is a conceptual block diagram illustrating an example network environment in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are computer-implemented methods, computer-readable media, and systems for enabling a computing device to communicate with a cloud network. First a connection between the computing device and the Internet is needed. Once connected, the computing device is directed to locate the cloud network. The computing device can then establish a secure communication channel between the computing device and the cloud network. The computing network can then transmit current configuration data about itself to the cloud network. The cloud network will evaluate the current configuration data and retrieve updates that would be needed to modify the computing device's current configuration data so that the cloud network can manage the computing device. The cloud network provides these updates to the computing device. The computing device will incorporate the updates so that the cloud network can remotely manage the computing device.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present description provides details regarding enabling computing devices (such as networking devices) to connect with cloud networks so that the computing devices can be managed by the cloud networks (thereby allowing enterprise as a service to be possible). Specifically, the cloud enablement is performed via zero touch provisioning which refers to an automated process where computing devices (which may not originally be capable of connecting with the cloud network or were not configured to) are provided the capabilities of connecting with the cloud network with minimal or no input from users. These computing devices are referred to herein as legacy computing devices. By modifying legacy computing devices (which either may not originally be connected to the cloud or may not have the capabilities of connecting to the cloud), this provides any computing devices of an enterprise the ability to become managed by the cloud network. The technology described herein provides features that allow for future proofing of different computing devices as updates and other provisions for the computing devices are possible using the cloud network.

Enterprise as a Service (EaaS) is a cloud computing service model that incorporates software, infrastructure, and platform offerings with business process management and governing service layers. EaaS provides comprehensive end-to-end business process management using cloud solution management and governance. This allows enterprises to control over their devices no matter where those devices are located so long as the devices are connected to the Internet. One feature that EaaS provides is the ability of the enterprise to manage connected computing devices remotely. The present embodiments provide legacy computing devices the ability to connect with the internet and with the cloud network so that these legacy devices can also be managed via the EaaS model.

FIG. 1 is a conceptual block diagram illustrating an example network environment 100 in accordance with various embodiments of the subject technology. The example network environment 100 includes a cloud network 110 that has, for example, a wireless enabled gateway 120 that allows the cloud network 110 to wirelessly communicate with different computing devices that are connected to the Internet. The cloud network 110 may be associated with an enterprise and used to manage its computing devices. Using the wireless enabled gateway 120, the cloud network 110 can provide updates and other information to connected computing devices that would allow the could network 110 to remotely manage them as well as push out any updates (e.g. updates to protect against zero-day exploits).

The example network environment 100 also includes numerous computing devices (e.g. legacy computing devices) 130. These legacy computing devices 130 may be incapable of initially connecting to the internet or specifically communicating with the cloud network 110. For example, the legacy computing devices 130 may not originally have the hardware capabilities (e.g. wireless or cellular technology) to connect to the Internet or connect with the cloud network 110. For example, these legacy computing devices 130 may have been used by the enterprise prior to the set up and use of the cloud network 110 by the enterprise that now manages the various computing devices on behalf of the enterprise.

In order to provide the legacy computing devices 130 the ability to communicate with the Internet (or more specifically with the cloud network 110), modifications can be performed on the legacy computing devices 130 so that they can communicate with the cloud network 110 and allow themselves to be remotely managed. The modifications can be in the form of an external hardware component 140 that is connected/attached/plugged into to the legacy computing devices 130. The hardware component 140 may include a hardware portion that provides communication features (e.g. wireless or cellular technology) as well as a software portion that provides instructions that would direct the legacy computing devices 130 on how to connect to the cloud network 110. Alternatively, the modification to the legacy computing device 130 can be an internal modification 150. The internal modifications 150 may be implemented to provide both hardware portion (e.g. wireless or cellular technology) and the instructions directing the computing device how to communicate with the Internet or cloud network. Internal modifications 150 can also be implemented to provide only the instructions if the computing devices 130 already has the necessary communication features to connect with the Internet and/or the cloud network 110 but does not have instructions on how to seek out the cloud network 110 specifically. Furthermore, internal modifications 150 may also be implemented during a production of the computing device.

In either case, the modifications to the legacy computing devices 130 provide the capabilities for the legacy computing devices 130 to 1) connect to the internet, 2) find the cloud network 110 that will be used to manage the legacy computing devices 130, and 3) establish a secure communication channel 160 between the legacy computing devices 130 and the cloud network 110. The secure communication channel 160 will be used to transmit (in one direction) information from the legacy computing devices 130 to the cloud network 110 that includes identifying information about the legacy computing device 130 and any configuration information that would be used by the cloud network 110 to identify corresponding updates for the legacy computing device 130. Furthermore, the communication channel 160 will be used to transmit (in the opposite direction) any updates from the cloud network 110 to be implemented at the computing devices 130. The updates provided by the cloud network 110 can be used, for example, to prevent zero-day exploits by fixing any issues with applications and/or operating systems of the legacy computing device 130. The updates can also be used to configure the legacy computing device so that the cloud network 110 can remotely manage the legacy computing device.

The cloud network 110 can be associated with a plurality of different cloud-based servers for the purpose of managing various computing devices belonging to a particular enterprise. Described in further detail in FIG. 2, the cloud network 110 is capable of carrying out various different functions in its management of computing devices it oversees. For example, the cloud network 110 is capable of remotely carrying out optimization of day-to-day operations of the computing devices, controls the access to the computing device by other users and/or other computing devices, and updating applications or operating system functionalities for the computing device. The management of the computing devices via the cloud network 110 allows enterprises to customize operations of their computing devices.

To facilitate management of the legacy computing devices by the cloud network 110, the cloud network 110 may include one or more databases. These databases store information that would be useful in updating different legacy computing devices so that they can be managed by the cloud network 110. For example, the information stored therein may be used to configure the legacy computing devices so that they can be remotely managed by the cloud network 110. The cloud network 110 can also store updates for the legacy computing devices 130. These updates can be used, for example, to provision, minimize or prevent zero-day exploits pertaining to the legacy computing device 130.

In another embodiment, the cloud network 110 may comprise a configuration server and a plurality of different management servers. The configuration servers would include the instructions that would be useable to configure different legacy computing devices 130 to be remotely managed by a management server of the cloud network 110. Each management server may, for example, be associated with a different enterprise. The configuration server would be usable to configure and to direct the legacy computing device 130 to a particular management server for future management. Based on the identification information provided by the legacy computing device 130, the configuration server would direct the legacy computing device 130 to the appropriate management server corresponding to the enterprise the legacy computing device 130 belongs to.

The wireless enabled gateway 120 provides the cloud network 110 the capabilities to communicate with the different computing devices 130 being managed by the cloud network 110. In this way, an enterprise can utilize the cloud network 110 to remotely manage the operation of its many computing devices. The management of the computing devices 130 via the cloud network 110 allows an enterprise to oversee its computing devices in a more efficient manner. For example, with the present embodiments, the cloud network 110 can be used to push out the same update to each similar computing device regardless of where the computing device is physically located. This is a more efficient and quicker process compared to the alternative of using one or more administrators that would manually provide the same update to each similar computing device. Furthermore, the cloud network 110 also allows for remote management of computing devices where computing devices may be located in different locations (especially in scenarios where the enterprise has multiple different physical locations).

Figure 2:
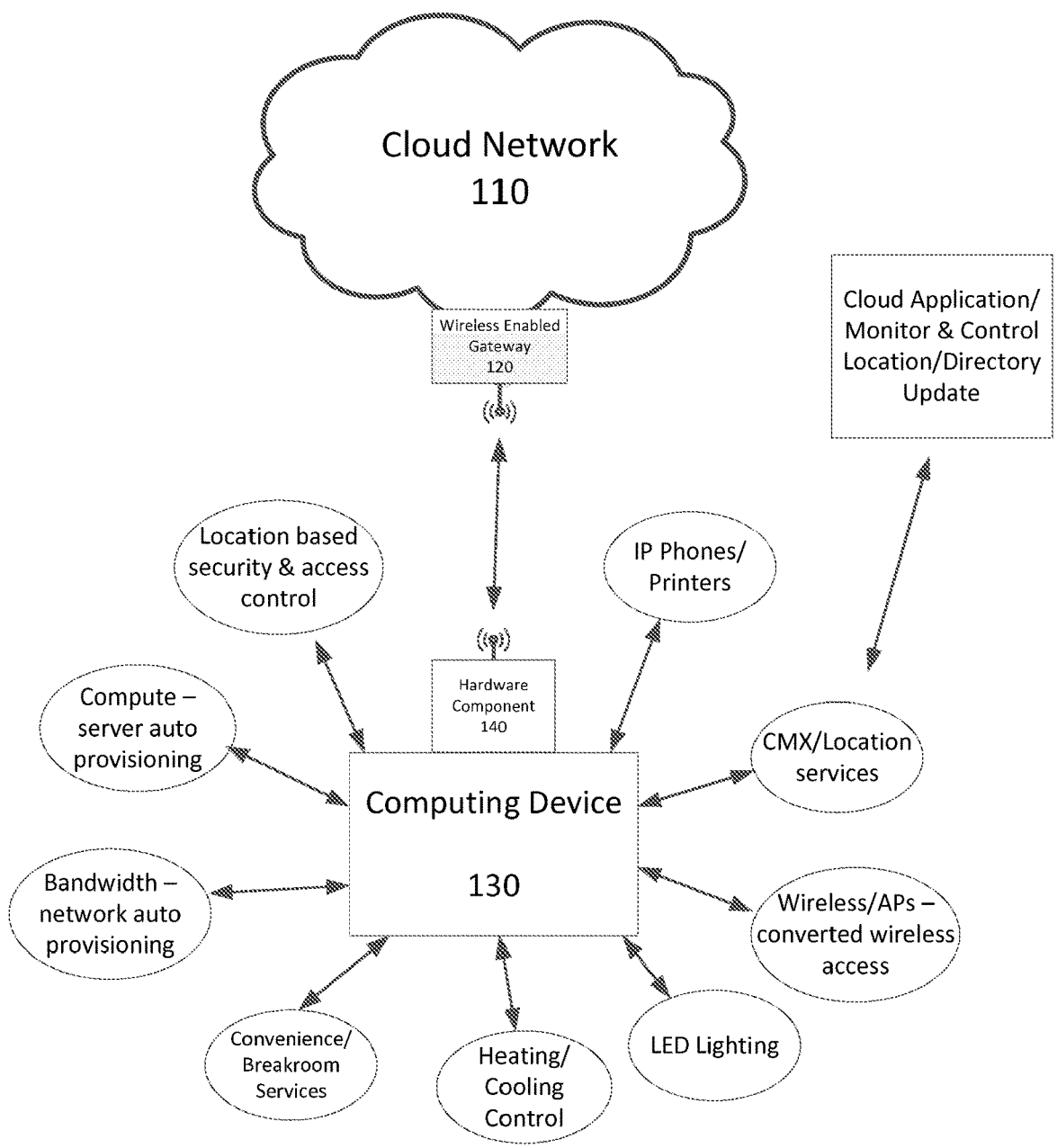
FIG. 2 is another conceptual block diagram illustrating cloud-based management features that are possible for computing devices in accordance with various embodiments of the subject technology.

The computing devices 130, as illustrated in FIG. 2, can correspond to various different types of computing devices that may not be capable of connecting to the Internet or communicating with the cloud network 110. Exemplary computing devices 130 may include (but would not be limited to) computing devices that are used on a daily basis within the enterprise such as pertaining to systems that control temperature, lighting, heating/cooling, and security. Other computing devices that can also be manage on behalf of the enterprise by the cloud network 110 can also include more IT-related assets such as switches, routers, servers, desktops, laptops, tablets, printers, and mobile devices.

In some cases, the legacy computing device 130 may not be capable of connecting to the Internet (e.g. lighting system) while others may be capable of connecting to the Internet but are not currently capable of being managed via the cloud network 110 (e.g. printer). This is where the hardware component 140 or the internal modification 150 come in. The modifications performed on the legacy computing device 130 using the hardware component 140 or the internal modification 150 provide the necessary capabilities for the computing devices 130 to connect with the cloud network 110 so that they can be managed by the cloud network 110. For the computing devices (such as lighting or heating/cooling systems) that are not capable of connecting to the Internet because they were not provided such functionality initially, the hardware component 140 can be used to provide hardware and software elements that would allow the legacy computing device 130 to communicate with the cloud network 110. An exemplary hardware component may include a plug-in external device (e.g. external USB dongle) that can be used to attach the hardware component to the legacy computing device 130 in order to provide the legacy computing device 130 accesses to the capabilities of a wireless communication module.

An exemplary hardware component 140 would be made up of at least a hardware portion and a software portion. The hardware portion would correspond to some form of wireless or cellular technology (e.g. Wi-Fi, 3G, 4G, 5G, LTE) that would allow the legacy computing device 130 to communicate with other computing devices or connect to the Internet directly. This would be helpful for those computing devices 130 that have no way to communicate with other computing devices or connect to the Internet. Furthermore, the hardware component 140 would include connective features that would allow the hardware component 140 to be integrated with the legacy computing device 130. Such connective features could be a universal serial bus (USB) connector or serial port feature that would allow the hardware component to become plugged into the legacy computing device 130.

Furthermore, the hardware component 140 would also include a software portion. The software portion would include instructions stored in memory that would be used to instruct the legacy computing device 130 on how to operate the hardware portion 140, for example, operate the wireless or cellular technology to connect to the Internet and communicate with the cloud network 110.

The software portion associated with the hardware component 140 may also include instructions to direct the legacy computing device 130 to perform a number of different processes. For example, the instructions may provide directions to the legacy computing device 130 regarding how to characterize or retrieve information used to advertise the identity of the legacy computing device 130 to the cloud network 110. Such instructions are used by the cloud network 110 to tailor any updates for the legacy computing device 130, for example, updates that would allow the cloud network 110 to manage the type of computing device over the cloud or identify what applications are currently stored on the computing device 130 so that corresponding updates can be provided.

Other types of instructions associated with the software portion may also include directions for the legacy computing device 130 to connect with other computing devices in order to 1) connect to the Internet and 2) identify where the cloud network 110 is located. This allows the legacy computing device 130 the ability to reach out to the cloud network 110 to establish the secure connection/communication channel that would be used to manage the legacy computing device 130 via the cloud network 110. Since the legacy computing device 130 may initially be unable to communicate directly with the cloud network 110, the legacy computing device 130 may utilize different processes (such as wireless mesh network) using its new wireless or cellular capabilities provided via the hardware portion to connect with other computing devices in order to connect to the Internet and/or communicate with the cloud network 110.

Once the secure connection between the legacy computing device 130 and the cloud network 110 has been made, the instructions (e.g. software portion) would detail how the legacy computing device 130 should identify itself, characterize its own information (e.g. retrieve configuration data), and transmit that data to the cloud network 110. Furthermore, the instructions would be used to instruct how the legacy computing device 130 would receive and implement the updates from the cloud network 110. The instructions automate the process of configuring the legacy computing device 130 so that the legacy computing device 130 can communicate with the cloud network 110 and in turn be managed by the cloud network 110.

Alternatively, as described above, the instructions included in the software portion of the hardware component 140 could also be used to direct the legacy computing device 130 to a configuration server within the cloud network 110. The configuration server could be used to inform to which additional server the legacy computing device 130 should communicate with. Specifically, the configuration server can direct the legacy computing device 130 to communicate with a management server associated with the enterprise; the management server being part of the cloud network and responsible for managing the computing devices for the associated enterprise. The configuration server would direct the legacy computing device 130 to the appropriate management server based on, for example, the identifying information provided by the legacy computing device 130.

In this way, the hardware component 140 would allow the legacy computing device 130 to connect with the Internet and the cloud network 110 when the legacy computing devices 130 are already in use by the enterprise by providing hardware portions (e.g. wireless or cellular technology) and software portions (e.g. instructions). In some embodiments, some computing devices 130 may have the pre-requisite hardware portions (e.g. wireless or cellular technology) to communicate with other computing devices or the Internet but are unable to connect with the cloud network 110. Furthermore, there may be computing devices 130 that may still be in production and not yet in use by an enterprise. In these situations, it may be appropriate to perform internal modifications to the legacy computing device 130, for example, modifying hardware of the legacy computing device 130 or storing instructions into the memory of the legacy computing device 130. Such internal modifications 150 may be performed to the legacy computing devices 130 instead of using the hardware component 140.

In either case (via a hardware component 140 or internal modifications 150), the legacy computing device 130 is provided an automated way of connecting to the Internet and the cloud network 110. That is because once the modification is performed to the computing device, for example, plugging in the hardware component 140, the instructions included therein automate the process of having the legacy computing device 130 utilize the wireless or cellular technology to connect to the Internet and in turn the cloud network 110. If the internal modifications 150 are used, the legacy computing device 130 would have the necessary capabilities to perform the necessary processes to connect to the Internet and the cloud network 110 without any further user involvement. In both cases, a user (e.g. administrator) is not needed to perform any actions on the legacy computing device 130 to connect the legacy computing device 130 to the internet or the cloud network 110. Herein referred to as zero-touch, the legacy computing device 130 is capable of performing the connection to the Internet and the cloud network 110 automatically so long as the hardware component 140 or the internal modifications 150 is provided to the legacy computing device 130.

FIG. 2 is another conceptual block diagram illustrating cloud-based management features 200 that are possible for computing devices in accordance with various embodiments of the subject technology. As discussed above, the cloud network 110 can be used by the enterprise to manage its computing devices 130. The management of the computing devices 130 by the cloud network 110 allows for remote control of the computing devices 130 regardless of where the computing devices 130 are located within the enterprises' network. Furthermore, the cloud network 110 is capable of utilizing information obtained from the computing devices 130 and other sources related to the enterprise to identify what updates (if any) should be sent down from the cloud network 110 to specific computing devices 130 so that the computing devices operate in a particular manner.

With the management of the legacy computing device 130 via the cloud network 110, enterprises are able to take advantage of information, for example, about a business location and provide instructions as appropriate for each legacy computing device 130. In an exemplary situation, the cloud network 110 may be capable of gathering information regarding each legacy computing device 130 pertaining to an enterprise's building. Such information can include when certain computing devices (e.g. switches, routers, servers, laptops, desktops, printers) are used, peak operating hours of the business, and where the computing devices are located and when they are in use within the build. This information that is collected can then be used by the cloud network 110 to manage, for example, other computing devices that are part of other systems associated with the enterprise. In one example, the cloud network 110 can be used to control the lighting and heating/cooling systems for the building. The lighting and heating/cooling systems can be controlled to operate in a particular manner, for example, to be turned on when employees are utilizing their respective computing devices but on power-saving mode when none of the computing devices are in use (e.g. after work hours when no one is in the building). In the same way, power for various other systems within the building can be controlled such as vending machines, rest rooms, and cleaning services based on the number of computing systems that are in use at a given time. The cloud network 110 could also manage the use of the enterprise network services based on the information in order to control bandwidth based on the traffic. More or less networking devices may be activated or deactivated based on the enterprise needs corresponding to the number of computing devices being used and where they are located within the building.

Other features that could be implemented for computing devices 130 within the enterprise by the cloud network that manages the computing devices 130 include controlling wireless access and security (e.g. VPN) for employees for enterprise computing devices and pushing out updates for the computing devices or applications stored within the computing devices. These updates can be used to maintain the current up-to-date operation of computing devices or applications but also to minimize or prevent exploits (e.g. zero-day) that could interfere with the enterprise's day-to-day operations.

Other functions can also be performed by the cloud network 110 in addition to the functions described above (or illustrated in FIG. 2) when managing various computing devices 130 associated with an enterprise. These functions can be pre-defined by an administrator or be based on functions performed for other similar enterprises.

Figure 3:
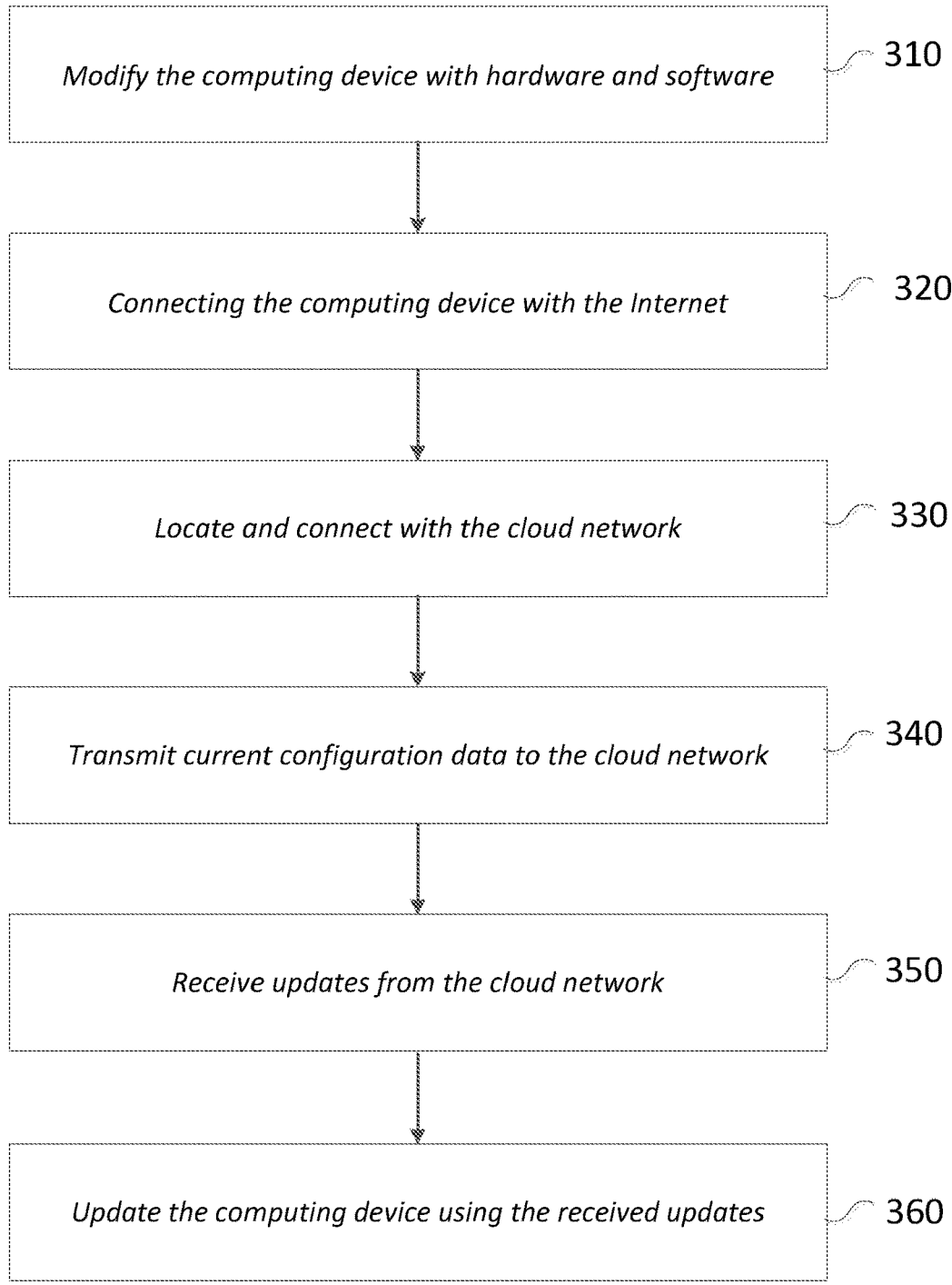
FIG. 3 is a flowchart illustrating the steps for configuring legacy computing devices so that the legacy computing devices are managed via the cloud.

FIG. 3 is a flowchart 300 illustrating the steps for configuring legacy computing devices so that the legacy computing devices can be managed via the cloud. As described above, a legacy computing device is a computing device that is not initially configured to communicate with the cloud network where the cloud network would be used to automatically configure or manage the legacy computing device. This can arise in situations where an enterprise is already using a number of computing devices and subsequently sets up and starts using a cloud network to manage its computing devices. The initial computing devices that were used prior to the use of the cloud network may not have the capabilities to communicate with the cloud network or may not have any directions how to connect to the cloud network. Therefore, the present disclosure describes the cloud enablement of these legacy computing devices via zero touch provisioning (i.e. minimal to no outside user input) so that these legacy computing devices can be managed and updated by the cloud network. In this way, any number of different computing devices can become managed by the cloud network within an enterprise thereby allowing the cloud network to automatically and remotely manage the operations and update the enterprise's computing devices as needed.

In a first step, the legacy computing devices that are not currently connected to (or unable to connect to) the Internet or the cloud network are modified so that they are capable to connect to the Internet or the cloud network (in step 310). In particular, the computing devices may be provided hardware portions (e.g. wireless communication technology) that enable wireless or cellular communication between the computing device and other computing devices or provide the ability of the computing device to connect with the Internet. Furthermore, the computing devices may also be provided software portions (e.g. instructions) that direct the computing devices on how to connect with other computing devices in order to find a computing device that is connected to the Internet or with the Internet directly. The software portions can also instruct the computing devices as to what types of information the computing device should provide to the cloud network once the connection between the computing device and the cloud network has been established. The modifications on the computing device can be performed using an external hardware component (as illustrated in FIG. 1) that can be connected to (e.g. plugged into) the computing device, for example, via a USB port or serial port. The hardware component would include the hardware portion and the software portion that the computing device may need in order to become cloud enabled thereby capable of communicating with the cloud network.

In some situations the computing device may already have pre-existing wireless or cellular technology that is redundant with the hardware portion of the hardware component. In that case, the hardware component could still be used to modify the operations of the computing device in order to provide the instructions needed to establish communication between the computing device with other computing devices/the Internet/the cloud network. However it may also be possible to modify the computing devices internally as well to provide the necessary software instructing the computing device how to communicate with the cloud network (e.g. where the instructions include the IP address of the cloud network).

Furthermore, there may also be scenarios where the computing device can also be modified internally. For example, hardware and software portions can be incorporated into the legacy computing device in order to modify a previous version of the computing device that would have been incapable of communicating with the cloud network. The user (or other party) can modify the internal hardware of the legacy computing device or download the instructions onto the legacy computing device. In this way, the computing device would be modified from a previous version to now be capable of connecting to other computing devices or the Internet in order to communicate with the cloud network.

Once the legacy computing device has been modified, the hardware portion (e.g. wireless or cellular technology) and the software portion (e.g. instructions) can be used by the legacy computing device to automatically locate and connect with the cloud network. In situations where the legacy computing device may not have been initially connected to the Internet, the computing device may begin by using its wireless or cellular technology to connect with other computing devices (in Step 320). The connection with the other computing devices allows the legacy computing device to establish a mesh network in order to find a computing device that is capable of connecting to the Internet and thus find a way for the computing device to connect to the cloud network.

The computing device that is being cloud enabled (as described herein) may know the identity of the cloud network (e.g. IP address) but not know how to connect to the Internet so that it can communicate with the cloud network. The legacy computing device connects with other computing devices in order to find an Internet connection (in Step 330). The connections with the other computing devices are used to establish a computing network until at least one computing device is capable of connecting to the Internet. Once the computing device connected to the Internet is found, the legacy computing device can subsequently communicate with the cloud network. The legacy computing device can then establish the secure communication channel with the cloud network that will be used by the cloud network to manage and update the legacy computing device.

Once the secure communication channel is established between the computing device and the cloud network, the computing device can begin transmitting its own current configuration data and identifying information to the cloud network (in step 340). The software portion of the hardware component or internal modifications of the legacy computing device includes instructions that direct the legacy computing device to provide types of information that may be needed by the cloud network to identify the type of legacy computing device and the current configuration of different applications or operating systems associated with the legacy computing device.

The information provided by the legacy computing device would facilitate the cloud network in looking for specific updates (stored in databases associated with the cloud network) that can be transmitted back to the legacy computing device (in step 350). In particular, the cloud network would evaluate the current configurations of the legacy computing device and identify any updates that may be necessary to 1) allow the cloud network to manage the computing device or 2) configure applications stored on the legacy computing device or operating system of the computing device to be up-to-date. If there are any conflicts on the legacy computing device that may prevent the cloud network from managing the legacy computing device, these conflicts may be resolved with the updates that are provided from the cloud network. The updates may be stored in memory associated with the cloud network. The cloud network could retrieve the appropriate updates and push those updates, for example, that are application or operating system specific in order to address issues such as security or operability of the application or operating system of the legacy computing device (e.g. zero-day provisioning and addressing/minimizing exploits).

Other updates can be retrieved from memory that would configure the computing device to be managed by the cloud network. These updates can also be provided to the computing device. Once the updates have been received by the computing device from the cloud network, the computing device can proceed with implementing the updates (e.g. patches) to its applications and/or operating system. Once implemented, the computing device can be managed by the cloud network. The cloud network may request information from the computing device or use other sources of information in order to modify the operation of the computing device. This allows the management of the computing device to be performed remotely (via the cloud) regardless of where the computing device is located as opposed to requiring an individual (e.g. administrator) to be at the location of the computing device to implement the updates. Furthermore, the cloud network is capable of providing updates for different applications or the operating system of the computing system on a regular basis (or based on a pre-determined time period) when such updates are available to the cloud network.

Figure 4A:
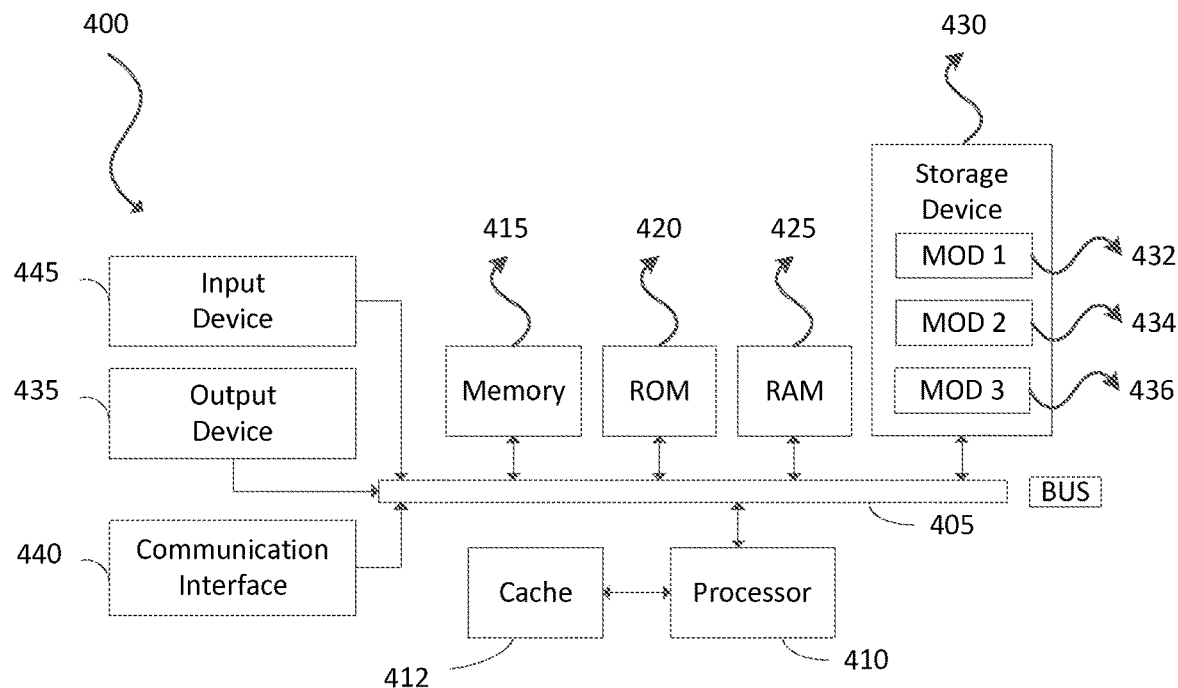
FIG. 4A and FIG. 4B illustrate examples of computing systems in accordance with some embodiments.
Figure 4B:
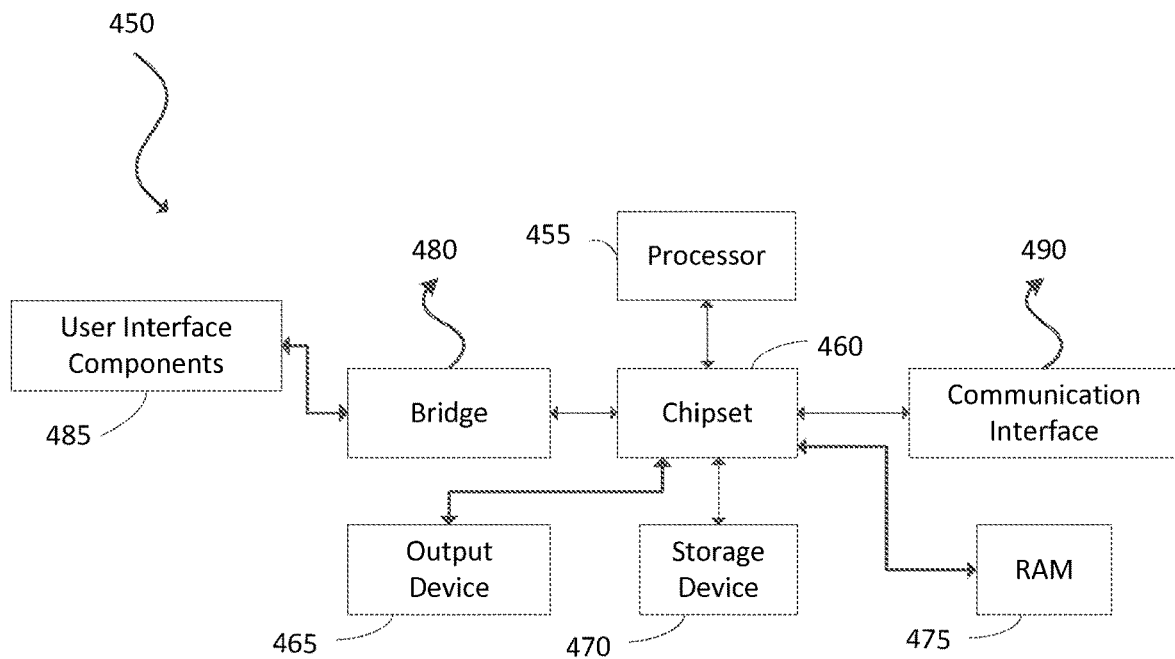

FIG. 4A and FIG. 4B illustrate systems in accordance with various embodiments. For example, the illustrated systems may correspond to the various computing devices within the network illustrated in FIG. 1. The more appropriate system will be apparent to those of ordinary skill in the art when practicing the various embodiments. Persons of ordinary skill in the art will also readily appreciate that other systems are possible.

FIG. 4A illustrates an example architecture for a conventional bus computing system 400 wherein the components of the system are in electrical communication with each other using a bus 405. The computing system 400 can include a processing unit (CPU or processor) 410 and a system bus 405 that may couple various system components including the system memory 415, such as read only memory (ROM) 420 and random-access memory (RAM) 425, to the processor 410. The computing system 400 can include a cache 412 of high-speed memory connected directly with, in close proximity to, or integrated as part of the processor 410. The computing system 400 can copy data from the memory 415 and/or the storage device 430 to the cache 412 for quick access by the processor 410. In this way, the cache 412 can provide a performance boost that avoids processor delays while waiting for data. These and other modules can control or be configured to control the processor 410 to perform various actions. Other system memory 415 may be available for use as well. The memory 415 can include multiple different types of memory with different performance characteristics. The processor 410 can include any general-purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing system 400, an input device 445 can represent any number of input mechanisms, such as a microphone for speech, a touch-protected screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing system 400. The communications interface 440 can govern and manage the user input and system output. There may be no restriction on operating on any particular hardware arrangement and therefore the basic features here may easily be substituted for improved hardware or firmware arrangements as they are developed.

Storage device 430 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435, and so forth, to carry out the function.

FIG. 4B illustrates an example architecture for a conventional chipset computing system 450 that can be used in accordance with an embodiment. Similar to FIG. 4A, the computing system 450 can correspond to the computing devices in the network illustrated in FIG. 1. The computing system 450 can include a processor 455, representative of any number of physically and/or logically distinct resources capable of executing software, firmware, and hardware configured to perform identified computations. The processor 455 can communicate with a chipset 460 that can control input to and output from the processor 455. In this example, the chipset 460 can output information to an output device 465, such as a display, and can read and write information to storage device 470, which can include magnetic media, and solid state media, for example. The chipset 460 can also read data from and write data to RAM 475. A bridge 480 for interfacing with a variety of user interface components 485 can be provided for interfacing with the chipset 460. The user interface components 485 can include a keyboard, a microphone, touch detection and processing circuitry, a pointing device, such as a mouse, and so on. Inputs to the computing system 450 can come from any of a variety of sources, machine generated and/or human generated.

The chipset 460 can also interface with one or more communication interfaces 490 that can have different physical interfaces. The communication interfaces 490 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 455 analyzing data stored in the storage device 470 or the RAM 475. Further, the computing system 400 can receive inputs from a user via the user interface components 485 and execute appropriate functions, such as browsing functions by interpreting these inputs using the processor 455.

It will be appreciated that computing systems 400 and 450 can have more than one processor 410 and 455, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for enabling a computing device to communicate with a cloud network, the method comprising:
    providing an outdated computing device, the outdated computing device due to its age lacking original hardware and/or software capability necessary to communicate with the cloud network;
    modifying the outdated computing device with hardware and/or software to be able to communicate with the cloud network;
    establishing a secure communication channel between the modified computing device and the cloud network;
    transmitting current configuration data from the modified computing device to the cloud network, wherein the cloud network evaluates the current configuration data from the modified computing device and retrieves updates directed at modifying the current configuration data of the modified computing device to allow the cloud network to manage the modified computing device;
    receiving the updates from the cloud network; and
    incorporating the received updates at the modified computing device.

2. The method of claim 1, wherein the modification is carried out via a hardware component, wherein the hardware component comprises hardware portions that facilitate communication with other computing devices or the Internet and instructions for the modified computing device directing the modified computing device to communicate with the cloud network, and wherein the hardware component is attachable to the computing device.

3. The method of claim 2, wherein the hardware component is attachable to the computing device via a Universal Serial Bus (USB) connector.

4. The method of claim 2, wherein the hardware portion provides communication using 3G, 4G, 5G, Wi-Fi, and LTE.

5. The method of claim 2, wherein the modifying the outdated computing device is carried out by modifying internal hardware of the computing device to include the hardware portion and the instructions directing the outdated computing device to communicate with the cloud network.

6. The method of claim 1, further comprising connecting the outdated computing device to the Internet using wireless mesh networks in connection with other computing devices until at least one other computing device is found that is connected to the Internet.

7. The method of claim 1, wherein the cloud network further retrieves updates for applications and/or an operating system of the outdated computing device based on the evaluated current configuration data and data stored on the cloud network.

8. The method of claim 7, wherein the retrieved updates for the applications and/or the operating system of the outdated computing device are directed at addressing zero-day exploits.

* * * * *